(12) United States Patent
Ye et al.

(10) Patent No.: US 6,414,788 B1
(45) Date of Patent: Jul. 2, 2002

(54) OPTICAL AMPLIFIER SYSTEM WITH TRANSIENT CONTROL

(75) Inventors: Jun Ye, Palo Alto; Yen-Wen Lu, Los Altos; Yu Cao, Cupertino, all of CA (US)

(73) Assignee: Onetta, Inc., Sunnyvale, CA (US)

( * ) Notice: Subject to any disclaimer, the term of this patent is extended or adjusted under 35 U.S.C. 154(b) by 0 days.

(21) Appl. No.: 09/711,923

(22) Filed: Nov. 15, 2000

Related U.S. Application Data (60) Provisional application No. 60/236,716, filed on Oct. 2, 2000.

(51) Int. Cl.[7] ............................................. H04B 10/12
(52) U.S. Cl. .............................. 359/341.41; 359/341.4; 359/337.11
(58) Field of Search ..................... 359/337.1, 337.11, 359/341.41, 341.4, 341.42

(56) References Cited

U.S. PATENT DOCUMENTS

| | | | |
|---|---|---|---|
| 5,245,690 A | | 9/1993 | Aida et al. .................. 385/142 |
| 5,513,029 A | | 4/1996 | Roberts ....................... 359/177 |
| 5,526,163 A | * | 6/1996 | Sugaya ........................ 359/179 |
| 5,703,711 A | * | 12/1997 | Hamada ...................... 359/341 |
| 5,745,283 A | | 4/1998 | Inagaki et al. .............. 359/341 |
| 5,812,710 A | | 9/1998 | Sugaya ......................... 385/27 |
| 5,900,969 A | | 5/1999 | Srivastava et al. .......... 359/341 |
| 5,995,274 A | * | 11/1999 | Sugaya ........................ 359/337 |
| 6,025,947 A | * | 2/2000 | Sugaya ........................ 359/160 |
| 6,049,413 A | | 4/2000 | Taylor et al. ................ 359/337 |
| 6,061,171 A | | 5/2000 | Taylor et al. ................ 359/341 |
| 6,091,541 A | * | 7/2000 | Yoon ........................... 359/341 |
| 6,094,298 A | | 7/2000 | Luo et al. .................... 359/346 |
| 6,144,485 A | | 11/2000 | Sugaya et al. ............... 359/337 |
| 6,163,399 A | | 12/2000 | Berg ............................ 359/341 |
| 6,166,850 A | | 12/2000 | Roberts et al. .............. 359/341 |
| 6,198,572 B1 | | 3/2001 | Sugaya et al. ............... 359/337 |
| 6,236,499 B1 | | 5/2001 | Berg et al. ................... 359/341 |

FOREIGN PATENT DOCUMENTS

| | | |
|---|---|---|
| EP | 0 734 105 A2 | 9/1996 |
| WO | 97/28584 | 8/1997 |
| WO | 00/41346 A1 | 7/2000 |

OTHER PUBLICATIONS

Sun et al. "Optical Fiber Amplifiers for WDM Optical Networks" Bell Labs Journal, p. 187–206, Jan.–Mar., 1999.

Nortel Networks Datasheet "MGM Multiwavelength Gain Module" (Nov. 3, 2000).

Ono et al. "Automatic Gain Control in Silica–Based EDFA with over 50nm Flat Gain Bandwidth using an all Optical Feedback Loop" 10th Optical Amplifiers and their Applications Technical Digest, Jun. 9–11, 1999.

(List continued on next page.)

Primary Examiner—Thomas H. Tarcza
Assistant Examiner—Andrew R. Sommer
(74) Attorney, Agent, or Firm—Fish & Neave; G. Victor Treyz (57) ABSTRACT

Optical amplifiers are provided that use a hybrid transient control scheme. Optical taps may be used to tap the main fiber path through the amplifier before and after the gain stage. The gain stage may be provided by one or more rare-earth-doped fiber coils such as erbium-doped fiber coils. The coils may be pumped by laser diodes or other suitable pumps. The optical output power of the pumps may be controlled by a controller. The controller may calculate the appropriate power to be applied by the pumps based on the measured input and output signal powers of the amplifier. The control process implemented by the controller may be based on a combination of feedback and feed-forward control techniques.

26 Claims, 10 Drawing Sheets

OTHER PUBLICATIONS

Kakui et al. "Dynamic–Gain–Tilt–Free Long–Wavelength Band Erbium Doped Fiber Amplifiers Utilizing Temperature Dependent Characteristics of Gain Spectrum" $25^{th}$ Optical Fiber Communication Conference, Technical Digest, p. 6–8, (Mar. 8, 2000).

Delavaque et al. "Gain Control in Erubium–Doped Fibre Amplifiers by Lasing at 1480nm With Photoinduced Bragg Gratings Written on Fibre Ends" Electronics Letters, vol. 29, No. 12, p. 1112–1114, Jun. 10, 1993.

Massicott et al. "1480nm Pumped Erbium Doped Fibre Amplifier with all Optical Automatic Gain" Electronics Letters, vol. 30, No. 12 p 962–964, Jun. 9, 1994.

Motoshima et al. "EDFA with Dynamic Gain Compensation for Multiwavelength Transmission Systems" OFC '94 Technical Digest, p. 191–192.

Zirngibl "Gain Control in Erbium–Doped Fibre Amplifiers by an All Optical Feedback Loop" Electronics Letters, vol. 27, No. 7, p. 560–561, Mar. 28, 1991.

* cited by examiner

|  | $P_{IN}$ | $P_A$ | GEF | $P_{OUT}$ |
|---|---|---|---|---|
| CH 1 | .01 W | 1/2 W | 1/3 | 1/6 W |
| CH 2 | .01 W | 1/3 W | 1/2 | 1/6 W |
| CH 3 | .01 W | 1/6 W | 1 | 1/6 W |

FIG. 7

|  | $P_{IN}$ | $P_A$ | GEF | $P_{OUT}$ |
|---|---|---|---|---|
| CH 1 | .01 W | 1/3 W | 1/3 | 1/9 W |
| CH 2 | 0 | 0 | 1/2 | 0 |
| CH 3 | 0 | 0 | 1 | 0 |

FIG. 8

|  | $P_{IN}$ | $P_A$ | GEF | $P_{OUT}$ |
|---|---|---|---|---|
| CH 1 | 0 | 0 | 1/3 | 0 |
| CH 2 | 0 | 0 | 1/2 | 0 |
| CH 3 | .01 | 1/3 W | 1 | 1/3 W |

OPTICAL AMPLIFIER SYSTEM WITH TRANSIENT CONTROL

This application claims the benefit of provisional patent application No. 60/236,716, filed Oct. 2, 2000.

BACKGROUND OF THE INVENTION

The present invention relates to fiber-optic communications networks, and more particularly, to optical amplifiers with transient control capabilities for use in optical communications networks.

In optical networks that use wavelength division multiplexing, multiple wavelengths of light are used to support multiple communications channels on a single fiber. Optical amplifiers are used in such networks to amplify optical signals that have been subject to attenuation over multi-kilometer fiber-optic links. A typical amplifier may include erbium-doped fiber amplifier components that are pumped with diode lasers. The erbium-doped fiber amplifier stages increase the strength of the optical signals being transmitted over the fiber-optic links.

The gain of the erbium-doped fiber amplifier stages depends on the inversion level of erbium ions in the fiber. If, for example, the inversion level of a given stage is high, the gain of the stage will be high. If the inversion level of a stage is low, the gain of the stage will be low. Unless control electronics are used to maintain a steady inversion level under various operating conditions, the gain of erbium-doped fiber amplifier stages will be subject to unacceptable transients. Gain transients in an amplifier may cause fluctuations in the power of the output signals from the amplifier. If the output signals are too weak, it may not be possible to detect the signals. If the output signals are too strong, the signals may be subject to nonlinear optical effects in the fiber.

It is an object of the present invention to provide optical amplifier systems in which gain transients are controlled.

SUMMARY OF THE INVENTION

This and other objects of the invention are accomplished in accordance with the present invention by providing optical amplifiers that use a hybrid transient control scheme. Optical taps may be used to tap the main fiber path through the amplifier before and after the gain stage. This allows the input and output power of the amplifier to be monitored. The gain stage may be provided by one or more rare-earth-doped fiber coils such as erbium-doped fiber coils. The optical power obtained from the taps may be monitored using photodetectors and analog-to-digital converters.

The coils may be pumped by laser diodes or other suitable sources of pump light. For example, the coils may be pumped using one or more laser diode sources with wavelengths of 980 nm or 1480 nm. The optical output power of such laser diodes may be controlled by controlling the amount of drive current used to power the diodes.

A controller may be used to calculate the appropriate drive current to apply to the pumps based on the measured input and output signal powers of the amplifier. The control process implemented by the controller may be based on a combination of feedback and feed-forward control techniques.

Further features of the invention and its nature and various advantages will be more apparent from the accompanying drawings and the following detailed description of the preferred embodiments.

DETAILED DESCRIPTION OF THE PREFERRED EMBODIMENTS

Figure 1:
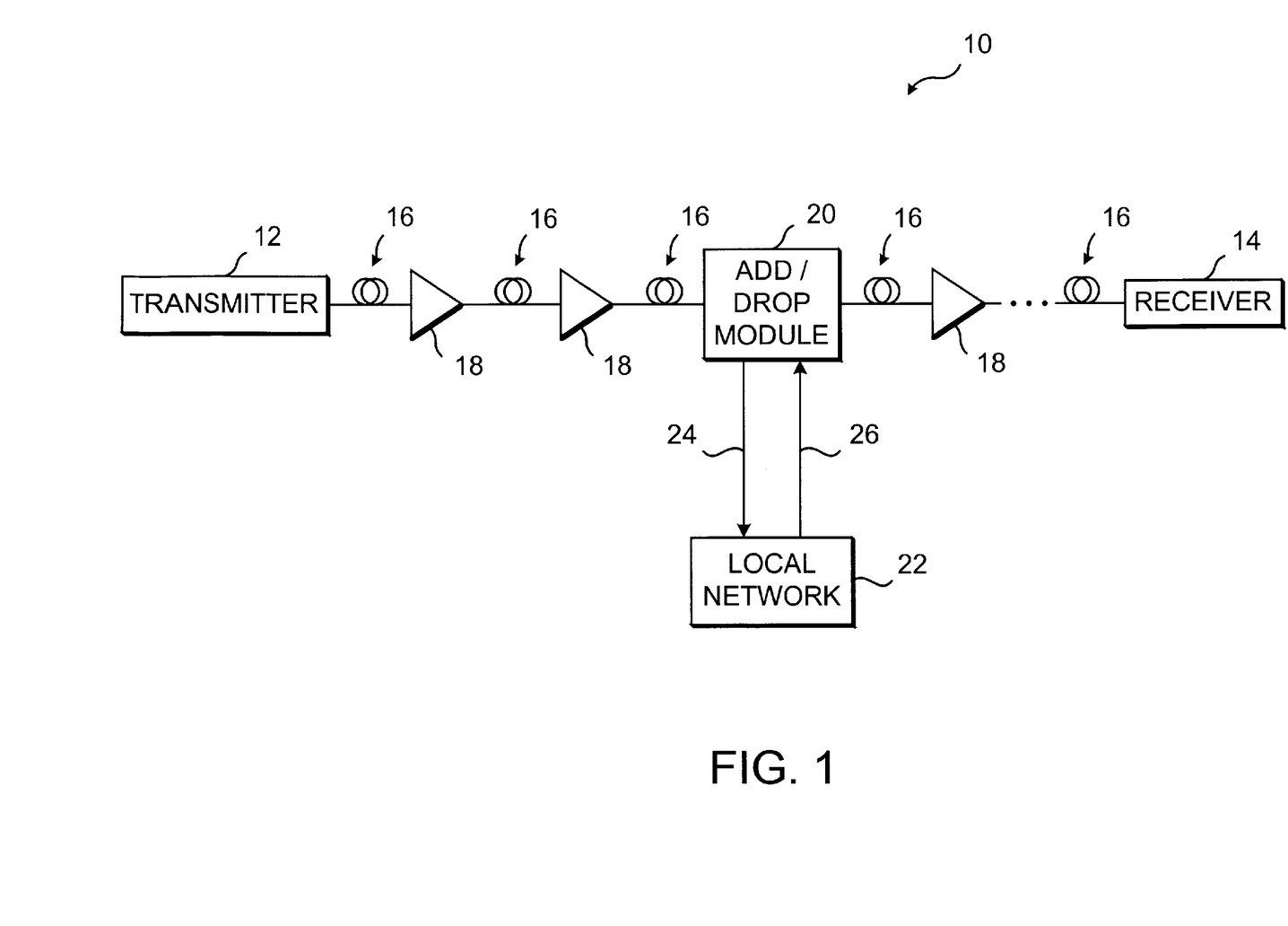
FIG. 1 is a schematic diagram of an illustrative optical communications link using optical amplifiers with transient control capabilities in accordance with the present invention.

An illustrative optical communications link 10 in accordance with the present invention is shown in FIG. 1. A transmitter 12 may transmit information to a receiver 14 over a series of fiber links. Each fiber link may include a span 16 of optical fiber. Fiber spans may be on the order of 40–120 km in length for long-haul networks or may be any other suitable length for use in signal transmission in an optical communications network.

As optical signals travel along the optical fibers 16, signal strength is attenuated. Optical amplifiers 18 may therefore be used to amplify the optical signals between successive spans of fiber.

The communications link of FIG. 1 may be used to support wavelength-division-multiplexing arrangements in which multiple communications channels are provided using multiple wavelengths of light. For example, the link of FIG. 1 may support a system with 40 channels, each using a different optical carrier wavelength. Optical channels may be modulated at, for example, approximately 10 Gbps (OC-192). The carrier wavelengths that are used may be in the vicinity of 1530–1560 nm. These are merely illustrative system characteristics. If desired, more channels may be provided (e.g., hundreds of channels), signals may be modulated at faster data rates (e.g., at approximately 40 Gbps for OC-768), and a wider range of carrier wavelengths may be supported (e.g., 1480–1610 nm).

Transmitter 12 may include laser diodes each of which supports a channel operating at a different wavelength. If one or more of these lasers is taken out of service or if new channels are added at transmitter 12, the number of wavelengths being transmitted across link 10 may change abruptly. The number of channels being carried by link 10 may also change due to unexpected system failures such as fiber cuts.

Link 10 may include add/drop modules such as add/drop module 20. Module 20 may be used to separate channels at certain wavelengths from the main fiber path in link 10. The separated channels may be provided to a local network such as local network 22 over a fiber link 24. Communications traffic from the local network may be provided to module 20 over a fiber link 26. If link 26 is cut accidentally or if the network is reconfigured so that a different number of channels are provided over the fiber span fed by module 20, the number of channels carried by link 10 following add/drop module 20 may change abruptly.

Figure 2:
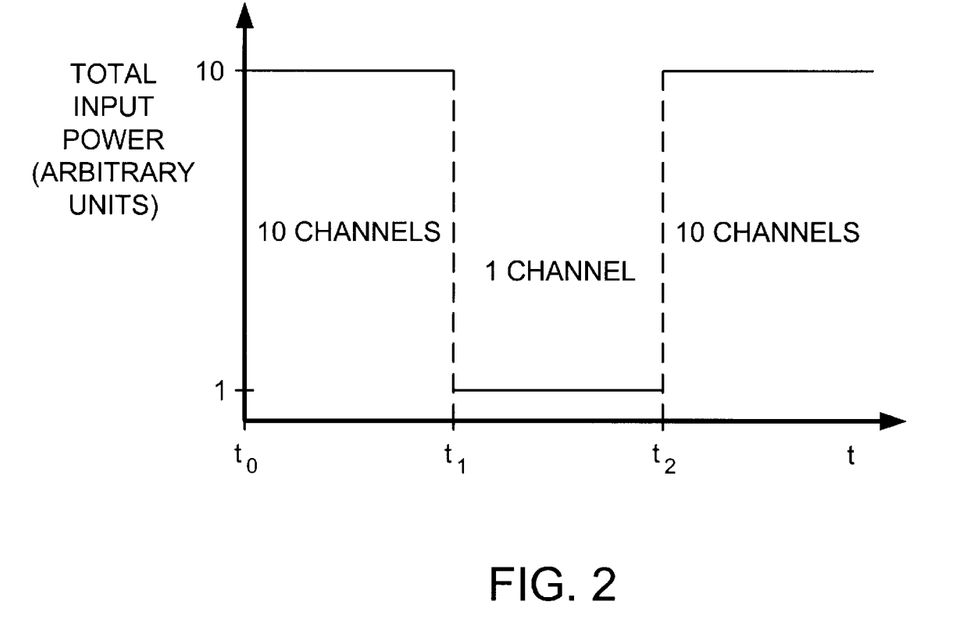
FIG. 2 is a graph showing how the input power applied to an optical amplifier may change suddenly when the number of channels handled by the amplifier changes.

A graph showing how the total signal power carried by a fiber in a link such as link 10 of FIG. 1 may vary under transient conditions is shown in FIG. 2. In the example of FIG. 2, the fiber link is initially carrying ten signal channels. The total input power at a given amplifier 18 of link 10 is therefore relatively constant between time $t_0$ and $t_1$. At time $t_1$, nine of the original channels are dropped (e.g., due to a system failure or an intentional system reconfiguration). As a result, the total power applied to the input of the given amplifier 18 drops to one tenth of its original level. At time $t_2$, the nine dropped channels are restored, so that the system is again handling ten channels. The total input power to the amplifier therefore increases abruptly. As illustrated by this example, optical amplifiers must handle transients due to both added channels and dropped channels.

Figure 3:
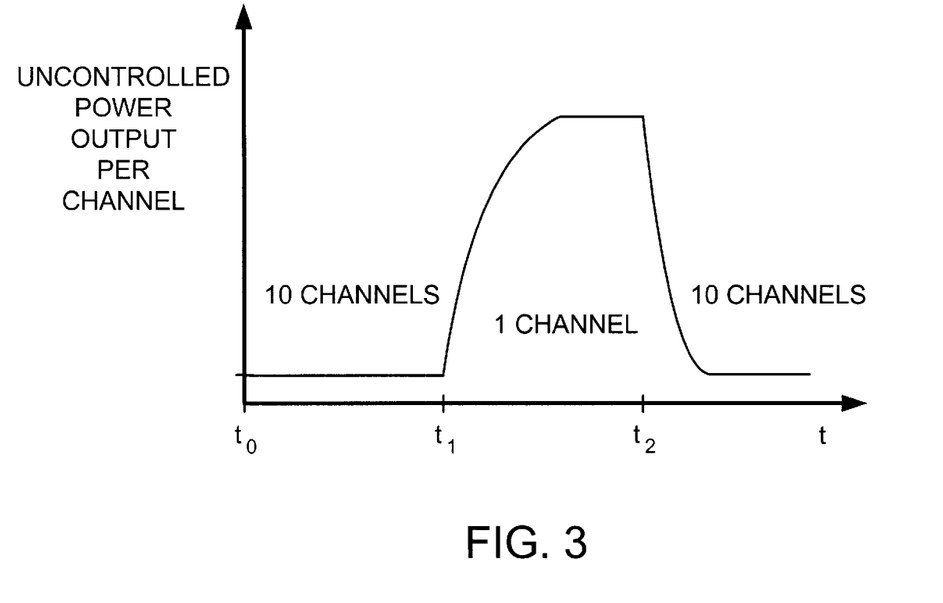
FIG. 3 is a graph showing the output power behavior of a fiber amplifier without transient control capabilities when the input power changes as shown in FIG. 2.

An erbium-doped fiber amplifier with a constant pump level will not produce a well-controlled output signal in response to such large variations in the input signal level. The output power per channel from an amplifier without transient control when the amplifier receives an input signal of the type shown in FIG. 2 is shown in FIG. 3. At $t_1$, when 9 channels are dropped, the output power for the surviving channel begins to rise (with a time constant on the order of milliseconds), because the pump power (which has not changed) is too large. The overly-large pump power builds up an excessive level of inversion in the fiber coil, which significantly increases the gain experienced by the surviving channel. As a rough approximation, the gain for the surviving channel increases to 10 times its previous value. This causes the amplifier output power for the surviving channel to increase to approximately 10 times its original level. An amplifier with gain fluctuations of this type is generally unacceptable, because the output power in each channel varies too much under different input conditions.

One possible approach for controlling the gain fluctuations in a fiber amplifier involves using a pure feedback approach. With this approach, the gain of the amplifier is monitored in real time by measuring the input and output powers. The pump power that is supplied to the fiber coils is adjusted as needed to maintain the gain at a fixed value. As illustrated by the example of FIG. 3, however, the output power of a channel does not rise or fall immediately after other channels have been added or dropped. This is because the average inversion level in the amplifier does not change instantly. As a result, there is a delay between the time at which an input channel is added or dropped and the time at which this change affects the measured gain ($P_{out}/P_{in}$). Accordingly, amplifier control systems based on pure feedback techniques may not be able to respond to changes in amplifier input conditions as rapidly as desired.

Another control technique that might be used to control the gain level in fiber amplifiers involves a pure feedforward approach. With this approach, the pump power that is supplied to the pump sources in the amplifier is determined based on the measured input power to the amplifier. This technique allows the amplifier to anticipate the effect that a change in input power will have on the amplifier even before that effect is measured at the amplifier output.

Figure 4:
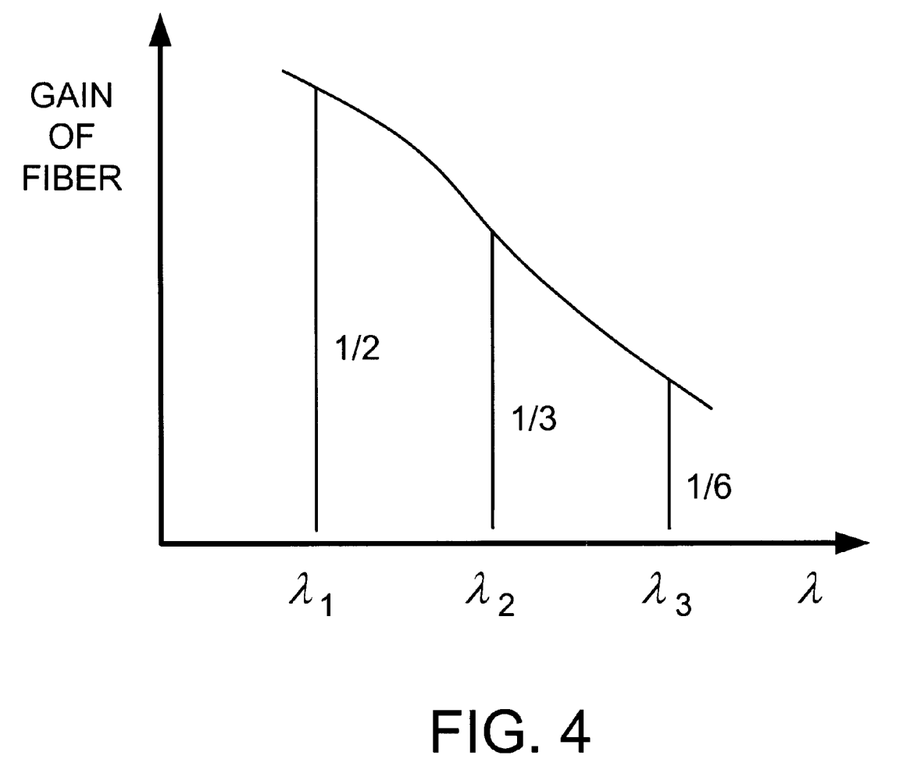
FIG. 4 is a graph showing a gain spectrum for a portion of an illustrative fiber amplifier coil in accordance with the present invention.
Figure 5:
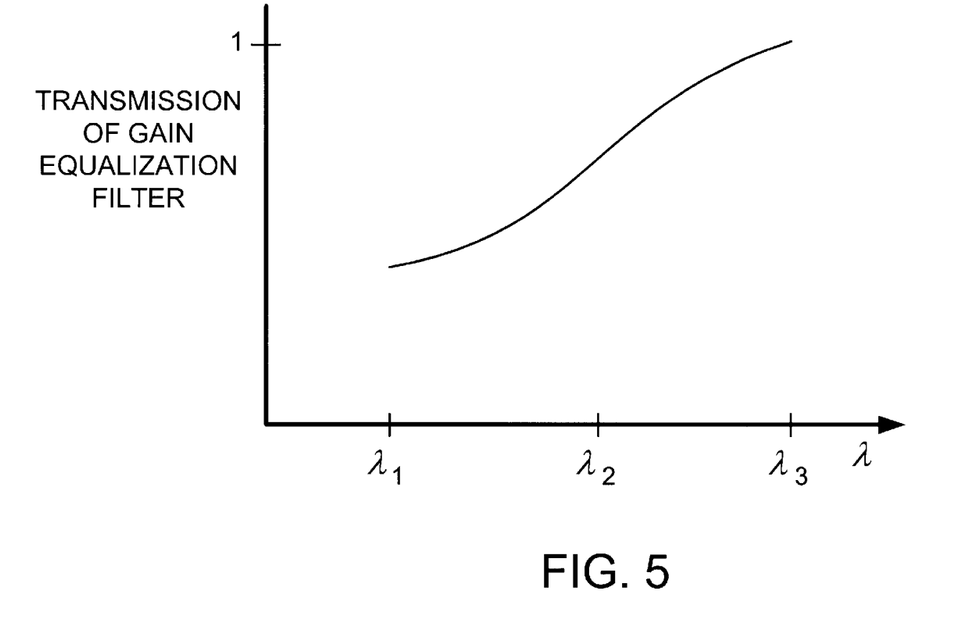
FIG. 5 is a graph showing a portion of the transmission spectrum of an illustrative gain equalization filter in accordance with the present invention.

However, pure feed-forward approaches are not able to control amplifier gain accurately in systems in which the gain of the amplifier's fiber coils is not spectrally flat. This is illustrated in FIGS. 4–9. An illustrative portion of a typical doped-fiber gain spectra is shown in FIG. 4. In the example of FIG. 4, the gain experienced by a signal at wavelength $\lambda_1$ is ½ (in arbitrary units), the gain experienced by a signal at wavelength $\lambda_2$ is ⅓ (in arbitrary units), and the gain experienced by a signal at wavelength $\lambda_3$ is ⅙ (in arbitrary units). In order to flatten the gain of an amplifier that uses the fiber of FIG. 4, a complementary gain equalization filter is placed in series with the amplifying fiber coil. An illustrative transmission spectrum for a gain equalization filter to be used to compensate for the gain spectrum of FIG. 4 is shown in FIG. 5. As shown in FIG. 5, the gain equalization filter transmits light at $\lambda_3$ without attenuation, but attenuates light at $\lambda_1$ and $\lambda_2$ to compensate for the larger gain experienced by these wavelengths in the fiber coil of the amplifier.

Figure 6:
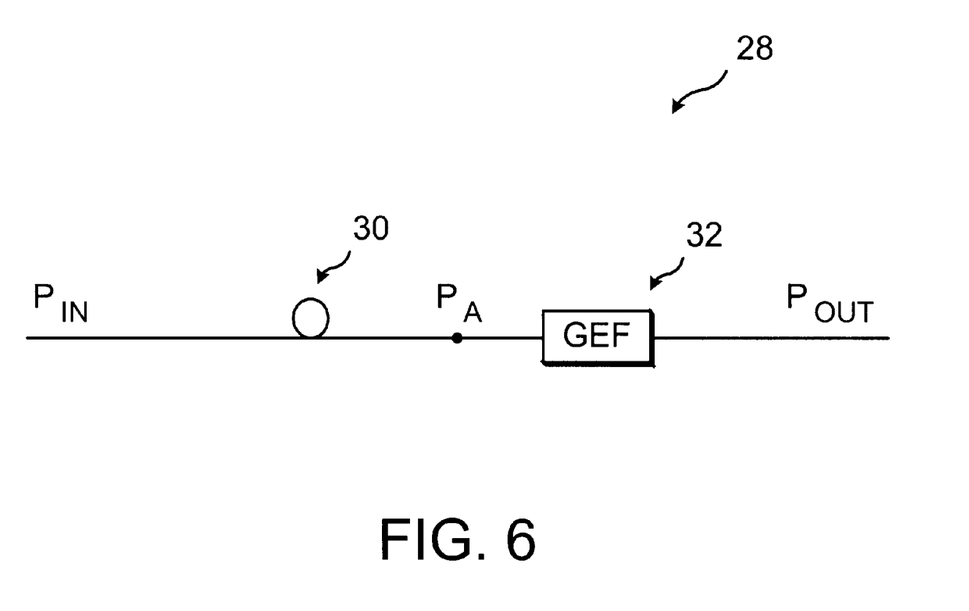
FIG. 6 is a simplified schematic diagram of a fiber amplifier having a fiber coil with a gain spectrum of the type shown in FIG. 4 and having a gain equalization filter with a transmission spectrum of the type shown in FIG. 5.

A simplified diagram of a fiber amplifier 28 having a fiber coil 30 with the gain spectrum of FIG. 4 and a gain equalization filter 32 with the transmission spectrum of FIG. 5 is shown in FIG. 6. With a pure feed-forward approach, input power that is measured at $P_{in}$ is used to control the pump power supplied to coil 30. The power in the fiber between coil 30 and gain equalization filter 32 has a power $P_A$. After the gain equalization filter, the output power of the amplifier is $P_{OUT}$.

Figure 7:
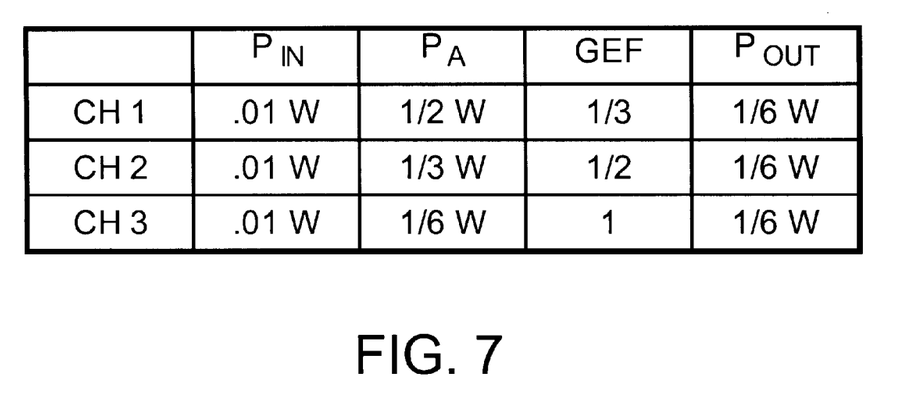
FIG. 7 is a table showing input and output conditions for a fiber amplifier of the type shown in FIG. 6 when three channels are being carried.

A channel dropping scenario that illustrates the problem associated with using the pure feed-forward control approach in fiber amplifiers of the type shown in FIG. 6 is described below in connection with the tables of FIGS. 7–9. Initially, as shown in the table of FIG. 7, the three wavelengths shown in FIGS. 4 and 5 are carried by the system. Channel 1 uses wavelength $\lambda_1$, channel 2 uses wavelength $\lambda_2$, and channel 3 uses wavelength $\lambda_3$. The input power for all three channels is the same, but due to the gain spectrum of FIG. 4, the power $P_A$ is greatest for channel 1 and is lowest for channel 3. The transmission of the gain equalization filter is selected to equalize for the differences in the power $P_A$. Accordingly, in the configuration of FIG. 7 in which all three channels are being carried, the output power for each channel is the same (⅙ W).

Figure 8:
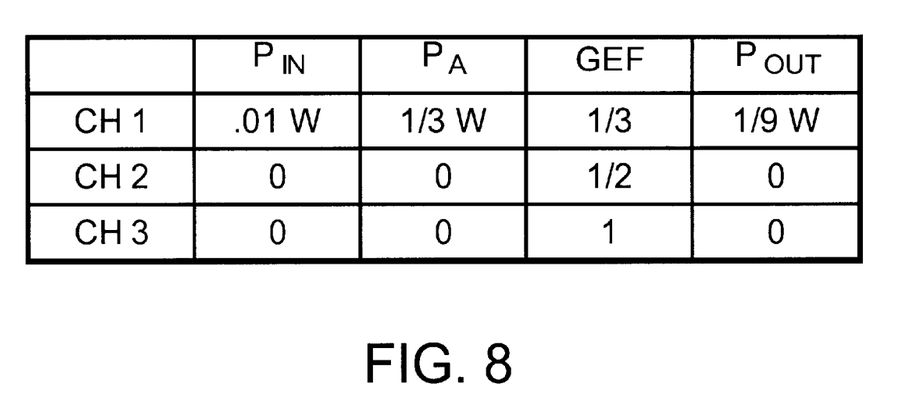
FIG. 8 is a table showing input and output conditions for a fiber amplifier of the type shown in FIG. 6 when the last two of the three channels of FIG. 7 have been dropped and a pure feed-forward control scheme is being used.

If channels 2 and 3 are dropped, as shown in the table of FIG. 8, the input power to the system is ⅓ of its original value (i.e., 0.01 W rather than 0.03 W). Using the pure feed-forward methodology, the pump power is therefore reduced to ⅓ of its original level. Because all of the gain in the amplifier is experienced by the signal on channel 1, the output power of coil 30 ($P_A$) is ⅓ W. After the gain equalization filter 32, the output power for channel 1 is ⅑ W.

Figure 9:
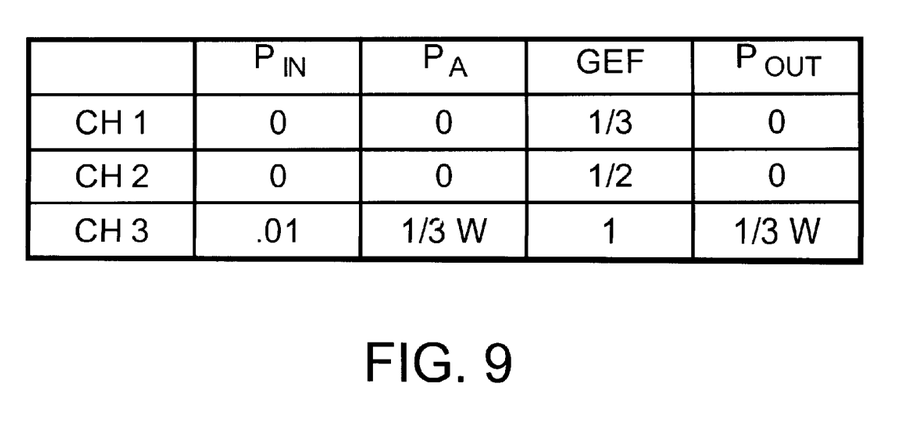
FIG. 9 is a table showing input and output conditions for a fiber amplifier of the type shown in FIG. 6 when the first two of the three channels of FIG. 7 have been dropped and a pure feed-forward control scheme is being used.

If, instead, channels 1 and 2 are dropped, as shown in the table of FIG. 9, the channel 3 signal experiences all of the gain of the amplifier. The pump power is reduced to ⅓ of its initial value based on the measured input power drop using the pure feed-forward approach. Accordingly, the channel 3 signal after coil 30 ($P_A$) is ⅓ W. Because the transmission factor for the gain equalization filter 32 is 1 (100%) at the channel 3 wavelength (as opposed to ⅓ at the channel 1 wavelength), the output power for channel 3 is ⅓ W.

Thus in the dropped-channel scenario of FIG. 8, an input power of 0.01 W is amplified to an output power of ⅑ W, whereas in the dropped-channel scenario of FIG. 9, an input power of 0.01 W is amplified to an output power of ⅓ W. This represents a significant variability in the gain performance of the amplifier and is generally unacceptable.

Figure 10:
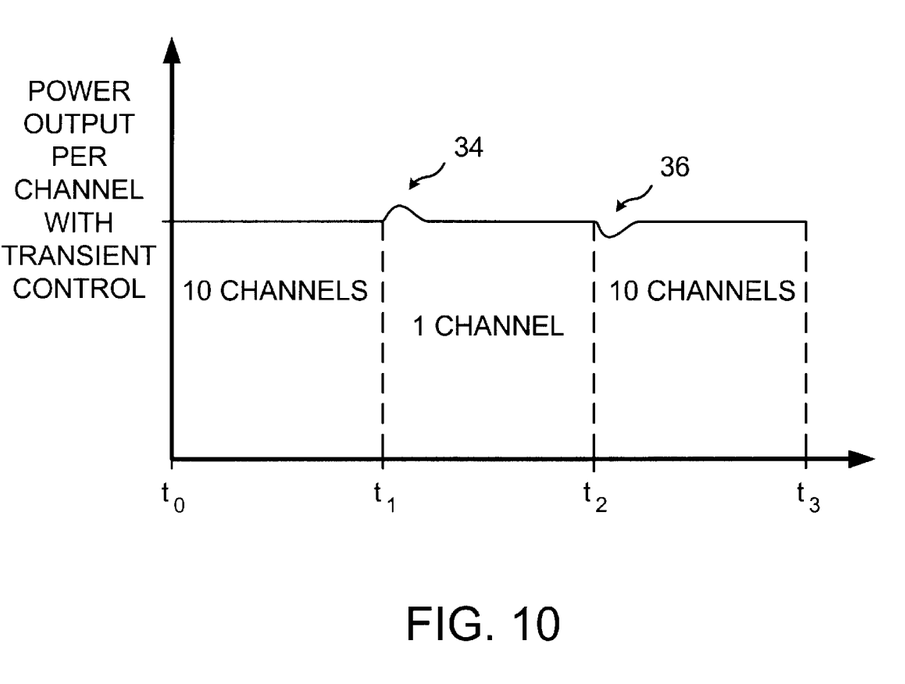
FIG. 10 is a graph showing how the output power of a fiber amplifier with hybrid transient control capabilities may be controlled when the input power changes as shown in FIG. 2 in accordance with the present invention.

In accordance with the present invention, a hybrid transient control approach is used that involves both feed-forward and feedback components. The gain for an amplifier using this transient control approach is relatively independent of the number of channels being amplified at any given time. A graph showing the consistency of the output power per channel for such an amplifier is shown in FIG. 10. Initially, between time $t_0$ and $t_1$, the amplifier is handling ten channels. At time $t_1$, nine of the channels are dropped. A small transient 34 in the output power is produced, but the hybrid transient control scheme significantly limits the magnitude of the transient. A similarly small transient 36 is produced when transitioning from one channel to ten channels at time $t_2$.

Figure 11:
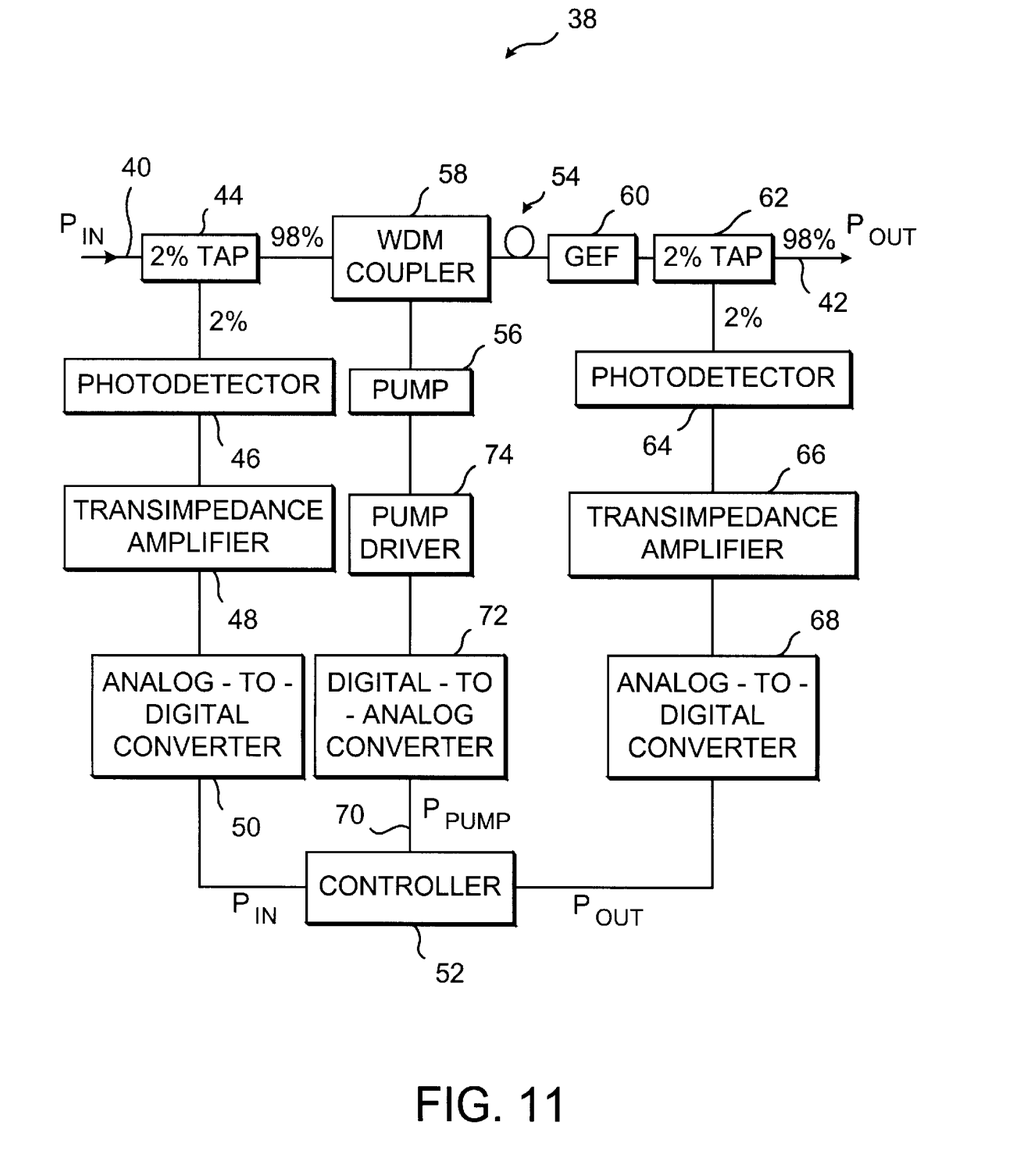
FIG. 11 is a schematic diagram of an illustrative optical amplifier with hybrid transient control capabilities in accordance with the present invention.

An illustrative fiber amplifier of the type that may use the hybrid transient control technique is shown in FIG. 11. The amplifier 38 of FIG. 11 is simplified to clarify the discussion. If desired, other fiber amplifier components such as additional filters, taps, amplifying fiber coils, pumps, dispersion compensation elements, variable attenuators, etc. may be used in the fiber amplifier.

Input signals may be provided to the amplifier at input fiber 40. Amplified output signals are provided at output fiber 42. A tap 44 (e.g., a 2%/98% tap) may be used at the input to amplifier 40 to measure an optical signal that is directly proportional to the input power. This signal is converted into an electrical signal by photodetector 46. Transimpedance amplifier 48 may be used to convert current signals from photodetector 46 into voltage signals for analog-to-digital converter 50. Controller 52 receives digital signals from analog-to-digital converter 50 for processing.

Optical signals are amplified by one or more optical gain sections such as rare-earth-doped fiber coil 54. Pump power for coil 54 may be provided by optical pump 56. Optical pump 56 may be any suitable pump source, such as one or more laser diodes operating at wavelengths of 980 nm or 1480 nm. Pump power from pump 56 may be coupled into fiber coil 54 using any suitable pump coupler such as wavelength division multiplexing coupler 58.

Gain equalization filter 60 may be used to flatten the gain spectrum of coil 54, so that amplifier 38 has a smooth optical gain spectrum.

The output power of amplifier 38 may be measured using tap 62 (e.g., a 2%/98% tap). Optical signals from tap 62 may be detected using photodetector 64. Transimpedance amplifier 66 may be used to convert current signals from photodetector 64 into voltage signals for analog-to-digital converter 68. Digital signals from analog-to-digital converter 68 are processed by controller 52.

Controller 52 may be based on any suitable control electronics such as one or more microprocessors, microcontrollers, digital signal processors, programmable logic devices, application-specific integrated circuits, etc.

Controller 52 may process the input power and output power information received from analog-to-digital converters 50 and 52 and may produce a corresponding digital pump control signal at output 70. The pump control signal may be converted into an analog control signal using digital-to-analog converter 72. The analog control signal from digital-to-analog converter 72 may be strengthened into a drive signal for pump 56 using pump driver 74.

Figure 12:
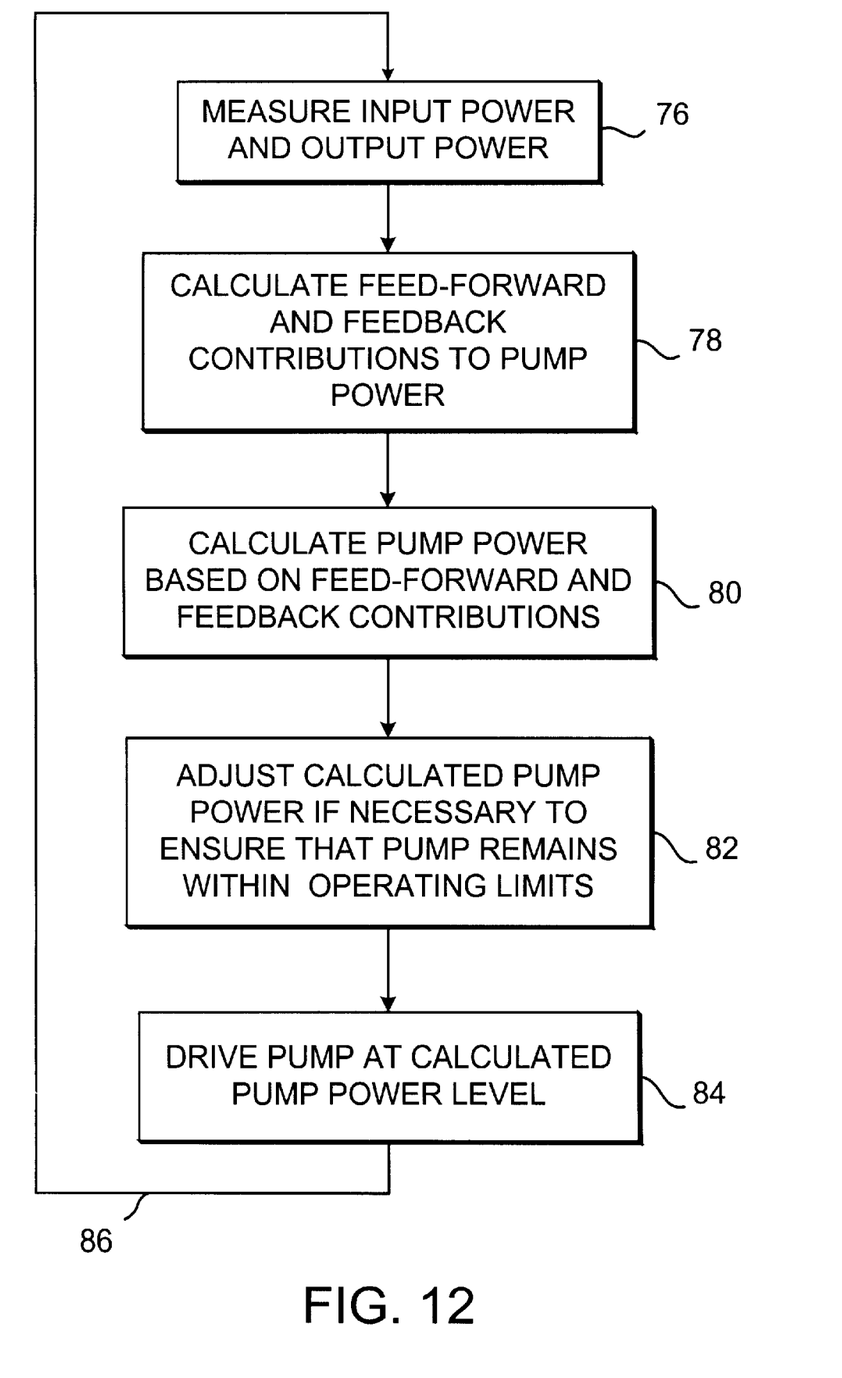
FIG. 12 is a flow chart of illustrative steps involved in providing transient control with the amplifier of FIG. 11 in accordance with the present invention.

Illustrative steps involved in controlling amplifier transients in an optical amplifier such as the optical amplifier of FIG. 11 using the hybrid transient control technique are shown in FIG. 12. The steps of FIG. 12 may be performed in a continuous loop. For example, steps 76, 78, 80, 82, and 84 may all be performed once every 100 ns.

At step 76, the amplifier may measure the input power using tap 44 and may measure the output power using tap 62. Controller 52 may calculate feed-forward and feedback contributions to the pump power at step 78. For example, a feed-forward pump contribution $P_{PUMP-FF}$ may be calculated by multiplying the input power times a fitting constant a, as shown in equation 1a.

$$P_{PUMP-FF} = a\, P_{IN} \qquad (1a)$$

The feed-forward pump contribution $P_{PUMP-FF}$ may also be calculated using equation 1b, where a and b are fitting constants.

$$P_{PUMP-FF} = a\, P_{IN} + b \qquad (1b)$$

Both equations 1a and 1b are linear approximations. Any suitable functional form may be used to represent the proportionality between the feed-forward pump contribution and the measured input power if desired. For example, higher-order functional forms may be used to define the relationship between input power and feed-forward pump power. The fitting constants of equations 1a and 1b may be determined experimentally.

A feedback pump contribution $P_{PUMP-FB}$ may be calculated by calculating a gain error parameter E using the expressions of equations 2a and 2b.

$$G_{measured} = P_{OUT}/P_{IN} \qquad (2a)$$

$$G_{measured} - G_{desired} \qquad (2b)$$

In equation 2a, $P_{OUT}$ is the output power measured at step 76, $P_{IN}$ is the input power measured at step 76, and $G_{measured}$ is the measured gain. In equation 2b, $G_{desired}$ is the desired (constant) gain for amplifier 38 and E is the gain error parameter. The gain error parameter E may be used to calculate the feedback pump contribution $P_{PUMP-FB}$, as shown in equation 3.

$$P_{PUMP-FB} = \alpha E + \beta \int E + \gamma E' \qquad (3)$$

In equation 3, $\alpha$, $\beta$, and $\gamma$ are fitting parameters that may be determined experimentally. Equation 3 is based on the well-known proportional-integral-derivative (PID) method. Any other suitable feedback technique may be used to calculate the feedback pump contribution if desired.

At step 80, the calculated feedback pump contribution $P_{PUMP-FB}$ and the calculated feed-forward pump contribution $P_{PUMP-FF}$ may be used to generate a desired value ($P_{pump}$) at which to drive the pump. Any suitable combining function f may be used, as set forth in equation 4.

$$P_{PUMP} = f(P_{PUMP\text{-}FF}, P_{PUMP\text{-}FB}) \quad (4)$$

As an example, $P_{PumP}$ may be calculated by linearly combining $P_{PUMP\text{-}FF}$ and $P_{PUMP\text{-}FB}$ as set forth in equation 5.

$$P_{PUMP} = P_{PUMP\text{-}FF} + P_{PUMP\text{-}FB} \quad (5)$$

At step 82, the pump power calculated at step 80 may be adjusted (if necessary) to ensure that the pump 56 operates within normal operating limits. For example, if the calculated pump power value is below the minimum required to ensure that the lasing threshold of pump 56 is surpassed, the calculated pump power may be raised to the lasing threshold value. If the calculated pump power value is above the maximum safe operating limit of pump 56, the calculated pump power may be lowered to ensure that the pump is not damaged.

At step 84, pump 56 may be driven at the calculated pump power level by supplying an appropriate drive signal to pump 56 using controller 52, digital-to-analog converter 72, and pump driver 74.

As shown by line 86, after step 84 is completed, steps 76, 78, 80, 82, and 84 are repeated. The loop speed is determined by the capabilities of the control electronics. In general, the control electronics should be selected to operate as rapidly as possible within cost constraints.

By combining both feedback and feed-forward contributions when determining the level at which to drive the pump, the drawbacks associated with using the pure feedback and pure feed-forward approaches are avoided. Because of its feed-forward contribution, the hybrid approach responds to changes in input power more quickly than pure feedback approaches. Because of its feedback contribution, the hybrid approach is less sensitive to gain fluctuations arising from the wavelength dependence of the fiber amplifier gain than pure feed-forward approaches. As a result, the hybrid control technique of the present invention may produce transient control results of the type shown in FIG. 10.

It will be understood that the foregoing is merely illustrative of the principles of this invention, and that various modifications can be made by those skilled in the art without departing from the scope and spirit of the invention.

What is claimed is:

1. An optical amplifier that amplifies optical signals at different wavelengths in a fiber-optic communications link comprising:
   an input fiber;
   an output fiber;
   at least one rare-earth-doped fiber;
   at least one pump that optically pumps the rare-earth-doped fiber to provide optical gain for the optical signals;
   input and output taps for monitoring the optical signals; and
   a controller that uses the input and output taps to monitor input power and gain in the amplifier and that controls the pump to prevent gain transients using a sum of one pump power contribution that is based on the monitored input power and another pump power contribution that is based on the monitored gain.

2. The optical amplifier defined in claim 1 wherein the controller is configured to adjust the pump when necessary to ensure that the pump remains within operating limits.

3. The optical amplifier defined in claim 1 wherein the rare-earth-doped fiber comprises erbium-doped fiber.

4. The optical amplifier defined in claim 1 wherein the rare-earth-doped fiber comprises erbium-doped fiber and wherein the pump comprises at least one laser diode operating at 980 nm.

5. The optical amplifier defined in claim 1 wherein the rare-earth-doped fiber comprises erbium-doped fiber and wherein the pump comprises at least one laser diode operating at 1480 nm.

6. The optical amplifier defined in claim 1 wherein the controller is configured to calculate the gain of the amplifier by dividing measured total output power by measured total input power for the optical signals in the amplifier.

7. The optical amplifier defined in claim 1 wherein the controller is configured to calculate the contribution to the pump power that is based on the monitored gain using the proportional-integral-derivative (PID) method.

8. The optical amplifier defined in claim 1 wherein the controller is configured to calculate the contribution to the pump power that is based on monitored input power using a linear approximation.

9. The optical amplifier defined in claim 1 further comprising a gain equalization filter that flattens the gain spectrum of the rare-earth-doped fiber.

10. A fiber-optic communications link that handles optical signals at different wavelengths including:
    a transmitter and a receiver;
    a plurality of fiber spans for transmitting optical signals between the transmitter and receiver; and
    a plurality of optical amplifiers, each of which is located between two of the fiber spans and each of which has:
       an input fiber that receives the optical signals from a first of the two fiber spans;
       an output fiber that provides amplified optical signals to a second of the two fiber spans;
       at least one rare-earth-doped fiber;
       at least one pump that optically pumps the rare-earth-doped fiber to provide optical gain for the optical signals;
       input and output taps for monitoring the optical signals; and
       a controller that uses the input and output taps to monitor input power and gain in the amplifier and that controls the pump to prevent gain transients using a sum of one pump power contribution that is based on the monitored input power and another pump power contribution that is based on the monitored gain.

11. The fiber-optic communications link defined in claim 10 wherein the controller in each amplifier is configured to adjust the pump when necessary to ensure that the pump remains within operating limits.

12. The fiber-optic communications link defined in claim 10 wherein the rare-earth-doped fiber in each amplifier comprises erbium-doped fiber.

13. The fiber-optic communications link defined in claim 10 wherein the rare-earth-doped fiber in each amplifier comprises erbium-doped fiber and wherein the pump in each amplifier comprises at least one laser diode operating at 980 nm.

14. The fiber-optic communications link defined in claim 10 wherein the rare-earth-doped fiber in each amplifier comprises erbium-doped fiber and wherein the pump in each amplifier comprises at least one laser diode operating at 1480 nm.

15. The fiber-optic communications link defined in claim 10 wherein the controller in each amplifier is configured to calculate the gain of the amplifier by dividing measured total output power by measured total input power for the optical signals in that amplifier.

16. The fiber-optic communications link defined in claim 10 wherein the controller in each amplifier is configured to calculate the contribution to the pump power that is based on the monitored gain using the proportional-integral-derivative (PID) method.

17. The fiber-optic communications link defined in claim 10 wherein the controller in each amplifier is configured to calculate the contribution to the pump power that is based on monitored input power using a linear approximation.

18. The fiber-optic communications link defined in claim 10 wherein each amplifier further comprises a gain equalization filter that flattens the gain spectrum of the rare-earth-doped fiber in that amplifier.

19. A method for controlling gain transients in a rare-earth-doped fiber amplifier having an optical gain, wherein the rare-earth-doped fiber amplifier is pumped using a pump laser and wherein the rare-earth-doped fiber amplifier amplifies optical signals that are provided to an input and provides corresponding amplified optical signals at an output, comprising:

monitoring optical signal input power at the input of the rare-earth-doped fiber amplifier;

monitoring the optical gain of the rare-earth-doped fiber amplifier;

calculating one pump power contribution based on the monitored input power;

calculating another pump power contribution based on the monitored optical gain;

calculating the pump power for the pump laser based on the sum of the calculated pump power contributions; and driving the pump laser at the calculated pump power.

20. The method defined in claim 19 wherein the pump laser has a lasing threshold, the method further comprising adjusting the calculated pump power before driving the pump laser when necessary to ensure that the pump laser exceeds the lasing threshold.

21. The method defined in claim 19 wherein the pump laser has a maximum safe operating limit, the method further comprising adjusting the calculated pump power before driving the pump laser to ensure that the pump laser does not exceed the maximum safe operating limit.

22. The method defined in claim 19 wherein calculating the pump power contribution that is based on the monitored input power comprises calculating a pump power contribution that is linearly proportional to the monitored input power.

23. The method defined in claim 19 wherein calculating the pump power contribution that is based on the monitored gain comprises calculating the gain of the amplifier using the monitored input power and a monitored output power.

24. The method defined in claim 19 wherein calculating the pump power contribution that is based on the monitored gain comprises:

calculating the gain of the amplifier using the monitored input power and a monitored output power; and using the proportional-integral-derivative method and the calculated gain to calculate the pump power contribution that is based on the monitored gain.

25. The method defined in claim 19 wherein calculating the pump power contribution that is based on the monitored gain further comprises calculating a gain error parameter.

26. The method defined in claim 19 wherein the rare-earth-doped fiber amplifier comprises an erbium-doped fiber amplifier.

* * * * *

UNITED STATES PATENT AND TRADEMARK OFFICE
CERTIFICATE OF CORRECTION

PATENT NO. : 6,414,788 B1
DATED : July 2, 2002
INVENTOR(S) : Jun Ye, Yen-Wen Lu and Yu Cao It is certified that error appears in the above-identified patent and that said Letters Patent is hereby corrected as shown below:

<u>Column 7,</u>
Line 57, "using a sum of" should be -- using a total pump power contribution that is a sum of --.

<u>Column 8,</u>
Line 42, "using a sum of" should be -- using a total pump power contribution that is a sum of --.

<u>Column 9,</u>
Line 30, "the pump power" should be -- a total pump power contribution --.

Signed and Sealed this

Twenty-fifth Day of October, 2005

JON W. DUDAS
*Director of the United States Patent and Trademark Office*